United States Patent
Cho

[11] Patent Number: 5,245,181
[45] Date of Patent: Sep. 14, 1993

[54] METHOD AND APPARATUS OF DETECTING DEVIATION OF SCANNING LINE OF LIGHT BEAM

[75] Inventor: Masamichi Cho, Kyoto, Japan

[73] Assignee: Dainippon Screen Mfg. Co., Ltd., Japan

[21] Appl. No.: 901,666

[22] Filed: Jun. 22, 1992

[30] Foreign Application Priority Data

Jun. 24, 1991 [JP] Japan .................. 3-180116

[51] Int. Cl.$^5$ .................. H01J 3/14; H04N 1/40
[52] U.S. Cl. .................. 250/236; 358/481
[58] Field of Search .................. 250/234–236, 250/201.1; 359/212–219, 221; 346/108; 258/494, 496, 481

[56] References Cited

U.S. PATENT DOCUMENTS

| | | | |
|---|---|---|---|
| 4,310,757 | 1/1982 | Check, Jr. et al. | 250/236 |
| 4,694,156 | 9/1987 | Swanberg | 250/236 |
| 4,841,135 | 6/1989 | Goto et al. | 250/236 |
| 4,983,827 | 1/1991 | Ikegaya et al. | 250/235 |
| 5,006,705 | 4/1991 | Saito et al. | 250/235 |
| 5,012,089 | 4/1991 | Kurusu et al. | 250/235 |
| 5,018,808 | 5/1991 | Meyers et al. | 250/235 |

FOREIGN PATENT DOCUMENTS

| | | | |
|---|---|---|---|
| 0163048 | 12/1979 | Japan | 359/217 |
| 0154816 | 9/1983 | Japan | 359/218 |
| 0164524 | 9/1984 | Japan | 359/217 |
| 0202431 | 11/1984 | Japan | 359/218 |
| 0073917 | 4/1986 | Japan | 359/217 |
| 0209417 | 9/1986 | Japan | 359/218 |
| 0316820 | 12/1988 | Japan | 359/218 |
| 0063917 | 3/1989 | Japan | 359/218 |
| 0088516 | 4/1989 | Japan | 359/218 |
| 0065921 | 3/1991 | Japan | 359/217 |

Primary Examiner—David C. Nelms
Assistant Examiner—Michael Messinger
Attorney, Agent, or Firm—Ostrolenk, Faber, Gerb & Soffen

[57] ABSTRACT

Beam position sensors detect deviations of a light beam from target positions defined at both sides of a recording drum. Predicted total deviations of light beam from the target positions are calculated as a function of beam position signals detected by the beam position sensors. A piezoelectric element of a sub-deflector is actuated in response to the predicted total deviations. The light beam deflected by a main deflector scans the target positions on a recording medium.

17 Claims, 7 Drawing Sheets

PRIOR ART

METHOD AND APPARATUS OF DETECTING DEVIATION OF SCANNING LINE OF LIGHT BEAM

BACKGROUND OF THE INVENTION

1. Field of the Invention

The present invention relates to an improvement in detecting deviation of scanning lines of a light beam which is employable in reproduction of images, production of printed circuit boards and the like.

More particularly, the present invention relates to detection of deviation of scanning lines in a light beam scanning apparatus including a rotary or vibratory type light deflector for deflecting a light beam modulated by an image signal to project the light beam onto a photosensitive surface for each scanning line.

The present invention is particularly effective for detecting deviation in a subscanning direction that is substantially perpendicular to a main scanning direction in which the light beam runs on the photosensitive surface along each scanning line.

2. Description of the Background Art

In light beam scanning apparatuses, the surface of a photosensitive material or the like is scanned with a light beam in a main scanning direction while relatively moving the light beam and the surface to be scanned in a subscanning direction that is substantially perpendicular to the main scanning direction, to expose the surface to be scanned. A light deflector is provided such a light beam scanning apparatus, which light deflector is operable to receive a light beam modulated by an image signal to deflect and project the light beam onto the surface to be scanned for each scanning line. The light deflector may be of a rotary or vibratory (pivotal) type, for example, a polygon mirror, a galvano mirror and a hologram disc.

In scanning of a light beam through a rotary or vibratory light deflector, the light beam sometimes scans out of a predetermined target scanning line due to stationary and unstationary deviation of deflection in the light deflector. In a polygon mirror, for example, each deflecting surface of the polygon mirror often has a portion which is not parallel to the rotation axis of the polygon mirror due to errors in shaping respective deflecting surfaces through a cutting process. The reflection of the light beam from this portion causes the scanning position of the light beam to stationarily deviate from the target scanning position on the surface to be scanned. Further, when the polygon mirror is rotated about the rotational axis, the respective angles of the deflecting surfaces to the designed rotational axis unstationarily deviate due to the deviation of the rotational axis, so that scanning lines unstationarily deviate in the subscanning direction.

In general, deviation of deflecting surfaces from designed planes are called as "inclination of deflecting surfaces". The stationary deviation due to the shaping errors of the deflecting surfaces is generally called as a "static inclination of deflecting surfaces", and the unstationary deviation of the deflecting surfaces due to the deviation of the rotational axis is generally called as "dynamic inclination of deflecting surfaces".

The positional deviations of scanning lines cause inferior quality of recorded images. It is hence necessary to correct the scanning position of the light beam to coincide with the predetermined target position. In a conventional light beam scanning apparatus adapted to make such correction, the total deviation of the practical scanning positions of the light beam from the target scanning positions in the subscanning direction is calculated through an additional optical system and the light beam is deflected in the subscanning direction to scan the target positions as a function of the total deviation.

Figure 11:
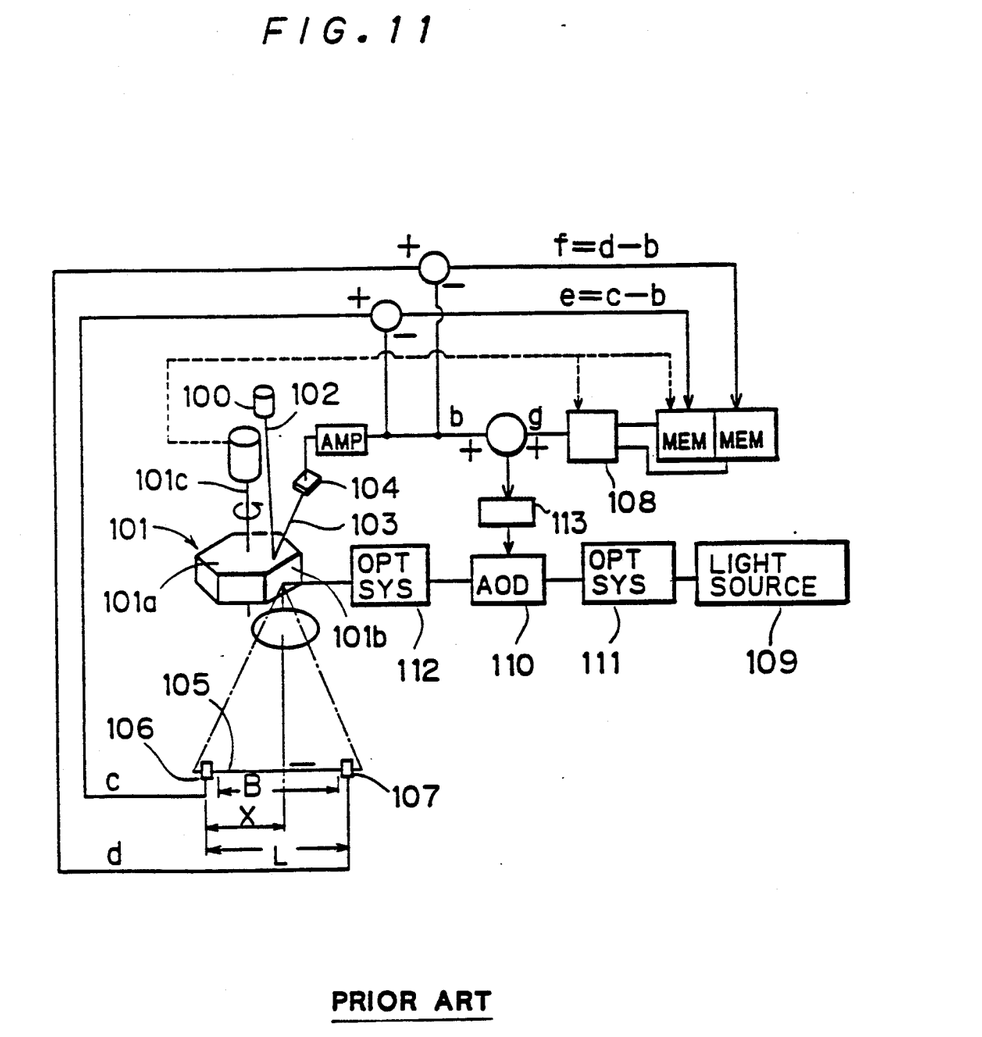
FIG. 11 schematically shows a structure of a conventional light beam scanning apparatus.

Referring to FIG. 11 depicting such a conventional apparatus, a monitor light beam 102 is projected from a monitor light source 100 onto a light-reflecting top surface 101a of a main light deflector 101 rotating on a rotational axis 101c. A position detector 104 detects the deviation of a reflected light 103 of the monitor light beam 102. The detected value represents unstationary deviation b of a deflecting surface 101b of the light deflector 101 in rotation.

Light-position detectors 106 and 107, which are disposed respectively at scanning start and end points of a scanning line 105, detect light beam positions c and d at the scanning start and end points in a subscanning direction. The unstationary deviation b is subtracted from the light beam positions c and d detected by the light-position detectors 106 and 107, to obtain stationary deviation e and f at the scanning start and end points in the subscanning direction. A computing unit 108 calculates stationary deviation g at each position in each main scanning as a function of the stationary deviation e and f through linear interpolation. The total deviation is obtained by adding the unstationary deviation b to the stationary deviation g calculated in the computing unit 108. A sub-deflector 110, which is an AOD in FIG. 11, is provided between optical systems 111 and 112. The sub-deflector 110 receives a signal representing the total deviation g+b through a drive circuit 113. A recording light source 109 generates a recording light beam. The recording light beam is deflected by the sub-deflector 110 in response to the signal to cancel the total deviation g+b.

In the conventional light beam scanning apparatus as above described, it is necessary for the main light deflector 101 to be formed with the light-reflecting top surface 101a for reflecting the monitor light beam 102 in addition to the deflecting surfaces 101b, in order to detect the unstationary deviation which is necessary to obtain the total deviation. However, high accuracy is required for shaping the reflecting top surface 101a, resulting in increasing costs of the main light deflector 101.

Furthermore, in order to calculate the total deviation, the conventional apparatus needs the additional optical components 100, 104 and others. This causes the problem that costs of the apparatus rises.

SUMMARY OF THE INVENTION

The present invention is directed to a method of detecting line-deviation of a scanning line of a light beam from a predetermined target line, wherein the deviation is caused in a subscanning direction crossing a main scanning direction along which the scanning line is defined.

According to the present invention, the method comprises the steps of: (a) providing a photosensor on a target position defined at a terminal position of the target line; (b) detecting the light beam by the photosensor to generate a beam position signal indicative of a positional deviation of a scanning position of the light beam from the target position in the subscanning position; (c) repeating the step (b) for a plurality of scanning cycles to thereby obtain a plurality of the beam position signals; (d) converting the beam position signals into a deviation signal including at least one component of the positional deviation; and (e) obtaining a line-deviation signal as a function of the deviation signal.

Preferably, the step (d) comprises the step of: (d-1) averaging the beam position signals to obtain a stationary deviation signal representative of stationary component of the positional deviation, the stationary component being substantially constant for the respective scanning cycles; and the step (e) comprises the step of: (e-1) obtaining the line-deviation signal as a function of the stationary deviation signal.

In a preferred embodiment of the present invention, the step (d) further comprises the step of: (d-2) subtracting the stationary deviation signal from the respective beam position signals to obtain a plurality of unstationary deviation signals representative of unstationary component of the positional deviation, the unstationary component substantially varying for the respective scanning cycles.

The line-deviation signal may be obtained as a function of the stationary deviation signal and the unstationary deviation signals.

The present invention also provides an apparatus for periodically deflecting a light beam to scan an objective plane, in which the present method is conducted.

According to the present invention, the deviation of the scanning line is measured without preparing a monitor light and without shaping non-deflecting surfaces of a deflector. Consequently, it is not required to accurately shape the non-deflecting surfaces of the deflector.

Accordingly, an object of the present invention is to detect deviation of a scanning line of a light beam without an expensive deflector in which accurate shaping is required not only on the light reflecting surfaces but also on other surfaces of the deflector.

It is another object of the present invention to independently detect stationary deviation of the scanning line due to that of a light deflector and an unstationary deviation due to deviation of the rotational axis of a deflector.

It is still another object of the present invention to decrease the cost of a deflecting apparatus having a function of correcting the beam path in a subscanning direction without expensive additional components.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
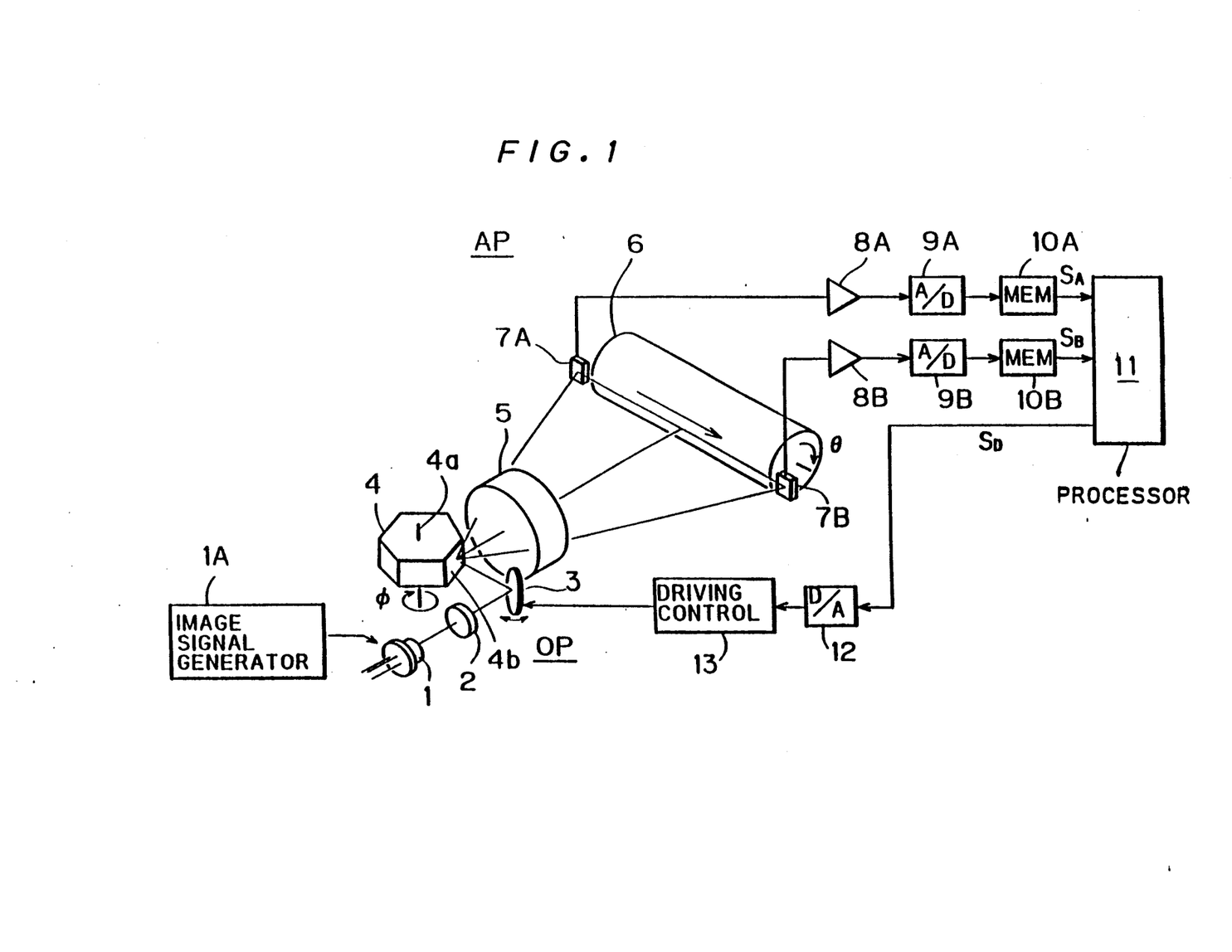
FIG. 1 schematically shows a structure of a light beam scanning apparatus according to a preferred embodiment of the present invention.

FIG. 1 schematically shows a structure of a light beam scanning apparatus according to a preferred embodiment of the present invention. The apparatus AP comprises an optical system OP having a laser diode 1 serving as a light source. The laser diode 1 emits a laser light modulated by an image signal given from an image signal generator 1A. A collimator 2 transforms the laser light into a light beam of collimated light, which is projected through a sub-deflector 3 onto a main deflector 4. The main deflector 4, which is a polygon mirror, rotates on a rotational axis $4a$ in the $\phi$ direction to deflect the light beam projected onto deflecting surfaces $4b$. The light beam deflected by the main deflector 4 passes through a scanning lens 5 such as an $f\theta$ lens and scans a recording medium 6. According to the preferred embodiment, the recording medium 6 is driven by a motor (not shown) to rotate in the $\theta$ direction. The recording medium 6 may be a photosensitive drum or a drum around which a photosensitive film is wound. When the main deflector 4 is a hexagonal polygon mirror, i.e., a polygon mirror having six deflecting surfaces $4b$, six scanning lines are traced on the recording medium 6 during each rotation of the main deflector 4. The scanning lines are traced such that the main scanning is carried out by the deflection of the main deflector 4, and such that the subscanning is carried out in the direction crosswise to the main scanning direction by the relative rotational movement of the optical system OP and the recording medium 6.

Figure 3:
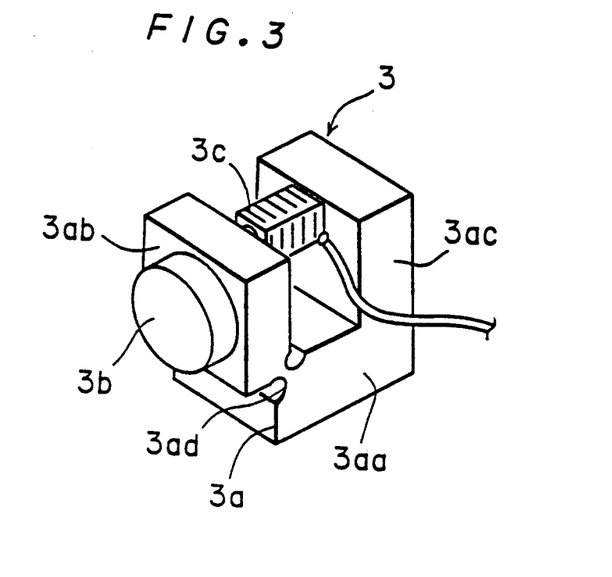
FIG. 3 is a perspective view of a correcting light deflector.

The sub-deflector 3 receives the light beam through the collimator 2 and is drived by a driving control unit 13 to deflecting the light beam. The sub-deflector 3 is capable to deflect the light beam within a predetermined deflection angle range in the vertical or subscanning direction. With reference to FIG. 3, the sub-deflector 3 includes a base member $3a$, and a mirror $3b$ and a piezoelectric element $3c$ mounted thereto. The base member $3a$ is made of elastic metal or a synthetic resin material. The base member $3a$ is comprised of a bottom portion $3aa$ and mounting portions $3ab$ and $3ac$ rising from both ends of the bottom portion $3aa$, thereby having a U-shaped configuration in side elevation. A thin hinge portion $3ad$ is formed at the joint of the bottom portion $3aa$ and mounting portion $3ab$. The mounting portion $3ab$ is pivotable backwardly and forwardly about the hinge portion $3ad$. The piezoelectric element $3c$ is interposed between the mounting portions $3ab$ and $3ac$. The mirror $3b$ is mounted on the outer wall surface of the mounting portion $3ab$. When a drive voltage is applied to the piezoelectric element $3c$, the element $3c$ expands or shrinks to provide slight rotary displacement to the mirror $3b$ about the hinge portion $3ad$. Inasmuch as the light beam projected through the collimator 2 is reflected by the mirror $3b$ to reach the main deflector 4, the slight rotary displacement of the mirror 3b enables the light beam to be deflected in the vertical or subscanning direction.

Referring again to FIG. 1 again, beam position sensors 7A and 7B are provided in positions corresponding to scanning start and end points on both sides of the recording medium 6, respectively. The beam position sensors 7A and 7B detect the positions of light spots thereon, that is, the positions of light spots at the start and end points of each scanning line in the subscanning direction to output detection signals in accordance with the positional displacement from a scanning target line.

Figure 4:
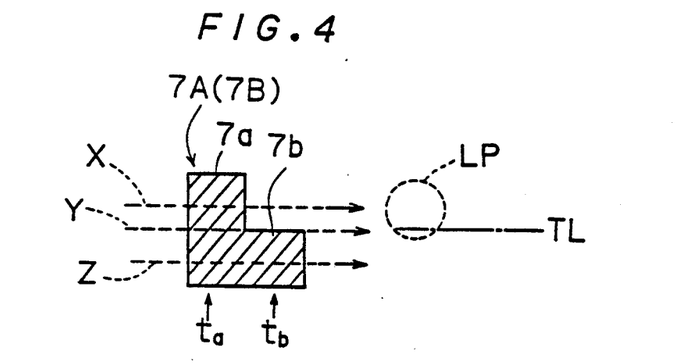
FIG. 4 is a schematic front elevation of a beam position sensor.
Figure 5A:
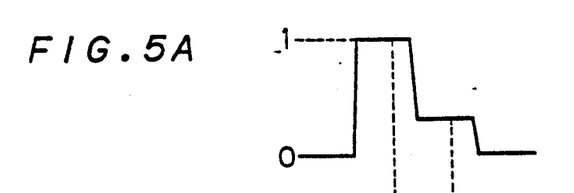
FIGS. 5A, 5B, and 5C illustrate detection signals of the beam position sensor of FIG. 4.
Figure 5B:
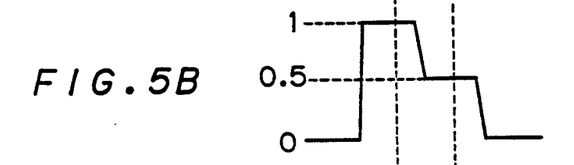
Figure 5C:
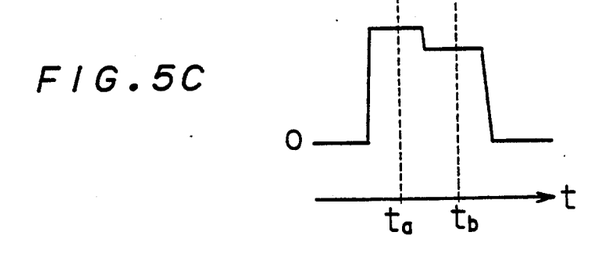

FIG. 4 shows an example of a photosensitive surface of the beam position sensors 7A and 7B in detail. The beam position sensors 7A and 7B are composed of a semiconductor photosensitive element having the photosensitive surface of an L-shape configuration in front elevation, the lower half of the photosensitive surface being wider than the upper half thereof. The beam position sensors 7A and 7B are provided such that the boundary line between the upper and lower halves agrees with a target scanning line TL. There are shown in FIGS. 5A to 5C position detection signals outputted from the beam position sensors 7A and 7B. A right portion 7b has the photosensitive surface only below the target scanning line TL in the main scanning direction, and left portion 7a has the photosensitive surface both above and below the target scanning line TL. The level of the position detection signal at the time $t_b$ at which the light spot LP (FIG. 4) corresponding to the light beam passes through the portion 7b is lower than the level thereof at the time $t_a$ at which the light spot LP passes through the portion 7a. The level of the position detection signal at the time $t_b$ varies depending on the vertical distance between the target scanning line TL and the position at which the center of the light spot LP passes through the photosensitive element. When the center of the light spot LP passes through the photosensitive element just on the target scanning line TL as indicated by the broken line Y of FIG. 4, the level of the position detection signal at the time $t_b$ is one-half of the level thereof at the time $t_a$ as shown in FIG. 5B. When the light spot passes through the photosensitive element above the target scanning line TL as indicated by the broken line X of FIG. 4, the level of the position detection signal at the time $t_b$ is less than one-half of the level thereof at the time $t_a$ as shown in FIG. 5A and varies depending on the passing position of the light spot. When the light spot passes through the photosensitive element below the target scanning line TL as indicated by the broken line Z of FIG. 4, the level of the position detection signal at the time $t_b$ is more than one-half of the level thereof at the time $t_a$ as shown in FIG. 5C and varies depending on the passing position of the light spot.

Consequently, the beam position is detected by the level of the position detection signal at the time $t_b$ by means of the light beam position sensors 7A and 7B of FIG. 4.

Photosensors having another structure may be employed in place of the light beam position sensors 7A and 7B shown in FIG. 4.

Figure 6:
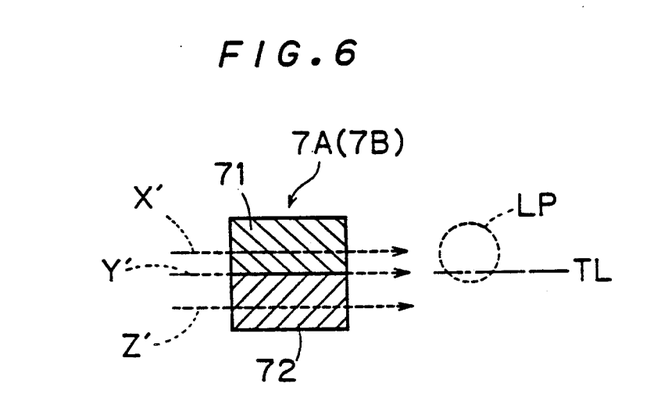
FIG. 6 is a schematic front elevation of another beam position sensor.
Figure 7A:
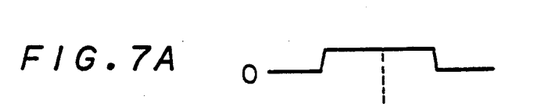
FIGS. 7A, 7B and 7C illustrate detection signals of the beam position sensor of FIG. 6.
Figure 7B:
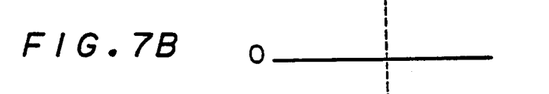
Figure 7C:
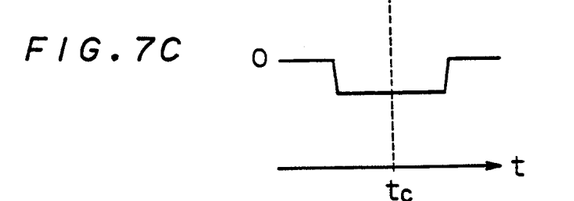

FIG. 6 shows other beam position sensors 7A and 7B. The beam position sensors 7A and 7B of FIG. 6 include semiconductor photosensitive elements 71 and 72 arranged vertically, bordering across the target scanning line TL. A difference in output signal level between the semiconductor photosensitive elements 71 and 72 is usable to obtain position detection signal. FIGS. 7A to 7C show position detection signals outputted from the beam position sensors 7A and 7B of FIG. 6. It is assumed that the intensity distribution of the light beam in a cross section thereof is Gaussian distribution. When the center of the light beam passes through the semiconductor photosensitive elements just on the target scanning line TL as indicated by the broken line Y' of FIG. 6, the output signal levels of the semiconductor photosensitive elements 71 and 72 are equal to each other, so that the position detection signal is zero as shown in FIG. 7B. When the light beam passes through the semiconductor photosensitive element above the target scanning line TL as indicated by the broken line X' of FIG. 6, the output signal level of the semiconductor photosensitive element 71 is higher than that of the semiconductor photosensitive element 72, so that the position detection signal varies in the plus region depending on the passing position of the light beam as shown in FIG. 7A. When the light beam passes through the semiconductor photosensitive element below the target scanning line TL as indicated by the broken line Z' of FIG. 6, the output signal level of the semiconductor photosensitive element 72 is higher than that of the semiconductor photosensitive element 71, so that the position detection signal varies in the minus region depending on the passing position of the light beam as shown in FIG. 7C.

The light beam scanning apparatus AP of FIG. 1 further includes amplifiers 8A and 8B, A/D converters 9A and 9B, memories 10A and 10B, a processor 11, a D/A converter 12 and the driving control unit 13.

The amplifiers 8A and 8B amplify the position detection signals outputted from the beam position sensors 7A and 7B shown in FIG. 4 or 6, respectively.

The A/D converters 9A and 9B digitize the analog signals outputted from the amplifiers 8A and 8B to transmit the digital signals to the memories 10A and 10B, respectively.

The memories 10A and 10B sequentially store the digital signals outputted from the A/D converters 9A and 9B, which are the beam position signals at the scanning start and end points. Once the number of the beam position signals stored in the memories 10A and 10B reaches a predetermined number, the memories 10A and 10B sequentially delete the oldest beam position signals each time new beam position signals are inputted thereto.

The processor 11 reads the beam position signals $S_A$ and $S_B$ from the memories 10A and 10B, and generates a driving signal $S_D$ in response to the beam position signals. The driving signal $S_D$ is outputted to the sub-deflector 3 in synchronism with the next main scanning of the light beam. The detailed structure of the processor 11 will be described below.

The D/A converter 12 converts the digital driving signal $S_D$ outputted from the processor 11 into an analog driving signal, which is transmitted to the driving control unit 13.

The driving control unit 13 applies a drive voltage in accordance with the inputted analog driving signal to the piezoelectric element 3c. The driving control unit 13 serves as a driving source of the sub-deflector 3.

Figure 2:
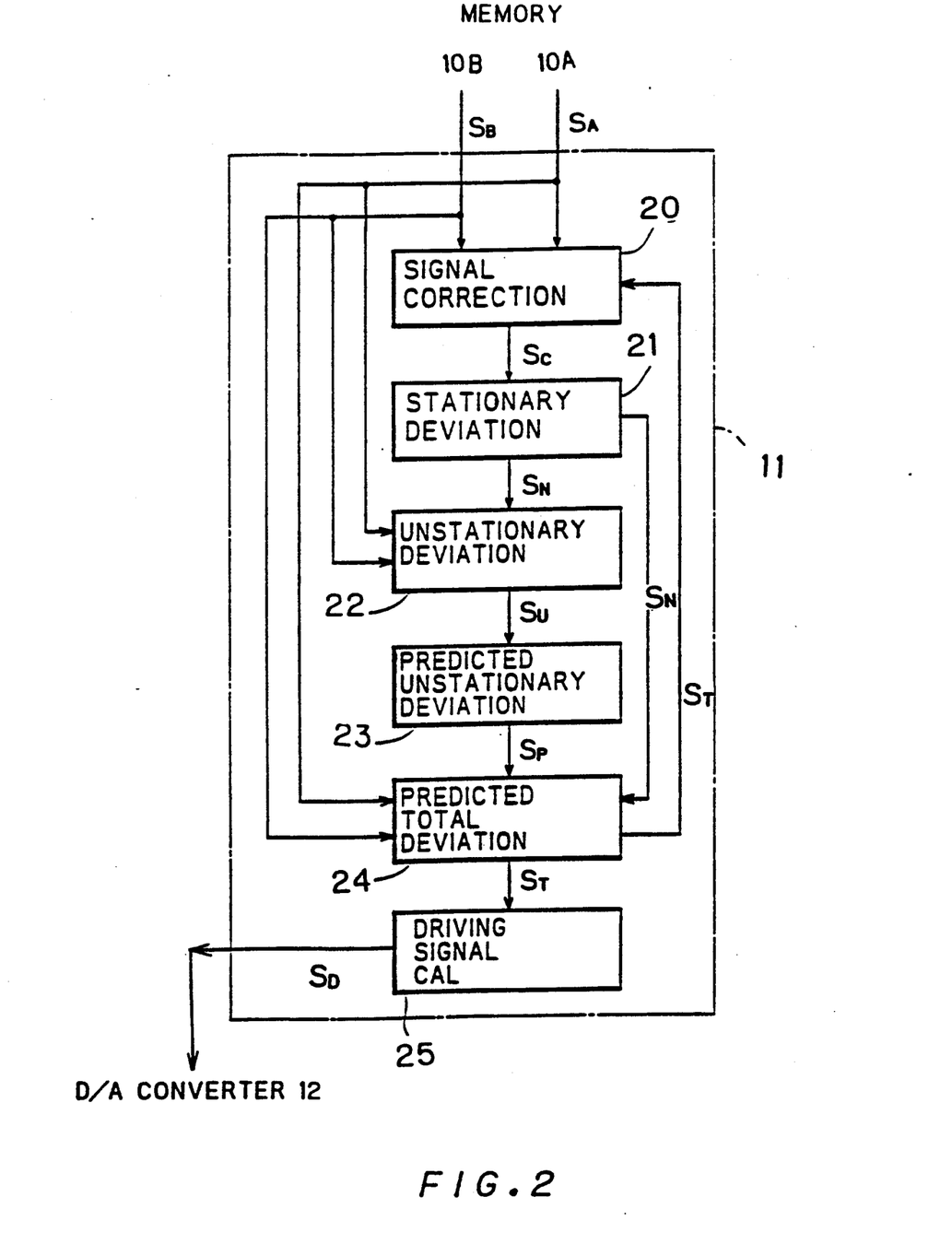
FIG. 2 is a functional block diagram of a processor employed in the apparatus shown in FIG. 1.

With reference to FIG. 2, there is shown a functional block diagram of the processor 11. Although respective elements in FIG. 2 will be described below as hardware blocks, they may be functional blocks attained by a software program applied to a microcomputer. Details of respective blocks will be more fully described later.

The processor 11 includes a signal correction circuit 20 for correcting the beam position signals $S_A$ and $S_B$ to generate a corrected signal $S_C$. A stationary deviation calculator 21 is operable to calculate static inclination errors in the polygon mirror 4 caused due to the shaping errors of the deflecting surfaces 4b, i.e., a stationary deviation. The stationary deviation is represented by a signal $S_N$ which is generated as a function of the corrected signal $S_C$. An unstationary deviation calculator 22 is operable to calculate dynamic inclination errors caused due to the deviation of the rotation axis of the main deflector 4 with the rotation of the main deflector 4, i.e., an unstationary deviation. The unstationary deviation is represented by a signal $S_U$ which is generated as a function of the signals $S_A$, $S_B$ and $S_C$.

A predicted unstationary deviation calculator 23 is operable to calculate predicted dynamic inclination errors in the next scanning, which errors are represented by a signal $S_P$. A predicted total deviation calculator 24 calculates total inclination errors in the next scanning, i.e., a predicted total deviation. The predicted total deviation is represented by a signal $S_T$. A driving signal calculator 25 is provided for calculating the driving signal $S_D$ for driving the sub-deflector 3.

Details of the functions of respective blocks are as follows:

The signal correction circuit 20 corrects the beam position signals $S_A$ and $S_B$ delivered from the memories 10A and 10B in accordance with the tilt angle of the mirror 3b of the sub-deflector 3 which is caused by driving the sub-deflector 3 through the driving controller 13, to generate the corrected beam position signal $S_C$. This correction is required from the fact that, where the mirror 3b of the sub-deflector 3 has already been driven, each beam position signal stored in the memories 10A and 10B does not represent the inclination errors of the deflecting surface 4b themselves but represents the difference between the inclination errors and tilt of the mirror 3b which has been already caused by the driving signal $S_D$ generated in previous control cycles. To obtain the true inclination errors, the deviations which have been compensated for by the tilt of the mirror 3b are stored in a memory and are added to respective values of the beam position signal which are read out of the memories 10A and 10B.

More particularly, the signal correction circuit 20 adds respective values of the predicted total deviation $P_T$ corresponding to the values of the beam position signal which have been calculated in the predicted total deviation calculator 24 in corresponding previous control cycles to the respective beam position signals delivered from the memories 10A and 10B. The corrected beam position signal $r_k$ is given by:

$$r_k = d_k + P_k \qquad (1)$$

where $d_k$ is the beam position signal stored in the memory 10A or 10B, and $P_k$ is the predicted total deviation corresponding to the beam position signal $d_k$. It will become apparent from the following description that the predicted total deviation $P_k$ corresponding to the beam position signal $d_k$ detected where the mirror 3b has no tilt is zero. In this case, the beam position signal $d_k$ itself is outputted as the corrected beam position signal $r_k$ from the signal correction circuit 20.

The stationary deviation calculator 21 averages the plurality of corrected beam position signals $S_C$ for previous control cycles to generate the signal $S_N$ representing the stationary deviation from the predetermined target scanning line at the scanning start and end points of the light beam deflected by the respective deflecting surfaces 4b of the main deflector 4. For example, the number of the beam positions detected during five rotations of the main deflector 4 having first to sixth deflecting surfaces 4b is sixty in total because the respective signals are detected at the scanning start and end points of the deflecting surfaces 4b. The sixty corrected beam positions $S_C = r_1$ to $r_{60}$ are obtained as a function of the beam positions $S_A$ (or $S_B$) = $d_1$ to $d_{60}$, respectively. The stationary deviation $S_N = S_1$ at the scanning start point corresponding to the first deflecting surface 4b is obtained by averaging the corrected beam positions $r_1$, $r_{13}$, $r_{25}$, $r_{37}$ and $r_{49}$ as follows:

$$S_1 = (r_1 + r_{13} + r_{25} + r_{37} + r_{49})/5 \qquad (2)$$

For calculating the stationary deviation $S_2$ at the scanning end point by the first deflecting surface 4b, the corrected beam positions $S_C = r_2$, $r_{14}$, $r_{26}$, $r_{38}$ and $r_{50}$ are averaged as:

$$S_2 = (r_2 + r_{14} + r_{26} + r_{38} + r_{50})/5 \qquad (3)$$

The stationary deviations $S_N = S_1$ and $S_2$ are calculated by averaging the corrected beam position signals $S_C$ for the reason described below.

Each corrected beam position signal $S_C$ contains the stationary deviation and unstationary deviation. The unstationary deviation periodically varies with the rotation of the main deflector 4. That is, it can be expected that the unstationary deviation periodically varies in sine or cosine wave function of the rotational angle about the rotational axis of the main deflector 4. The angular period in the periodic variation is in a second-order in degree of angle. Thus, it is expected that the fluctuations in positions of the scanning start and end points due to the unstationary deviation are periodic. The value obtained by averaging a number of the corrected beam position signals at the scanning start or end point approximates a value in which the unstationary deviations at respective sampling points are cancelled out, i.e., the stationary deviation. The stationary deviation is calculated from the five corrected beam position signals in Formulas (1) and (2) for the purpose of simplification. As the number of corrected beam position signals used for the averaging calculation increases, the accuracy of the stationary deviation obtained by the averaging calculation is more enhanced. In practice, a substantially accurate stationary deviation is obtained by using the corrected beam position signals in the order of several thousands. The stationary deviation obtained is regarded as constant at least during a time period of the detection of the beam position signals on which the corrected beam position signals used in the calculation are based.

The unstationary deviation calculator 22 subtracts the stationary deviations $S_N$ calculated in the stationary deviation calculator 21 from the corrected beam position signals $S_C$ used in the stationary deviation calculator 21, to determine the unstationary deviations for each scanning at the scanning start and end points of the light beam deflected by the deflecting surfaces 4b of the main deflector 4. For example, the stationary deviation $S_1$ is subtracted from the corrected beam positions $r_1$, $r_{13}$, $r_{25}$, $r_{37}$ and $r_{49}$ used for determining the stationary deviation $S_1$, to obtain the unstationary deviations $S_U = a_1$, $a_{13}$, $a_{25}$, $a_{37}$ and $a_{49}$ at the scanning start point by the first deflecting surface 4b, respectively (e.g., $a_1 = r_1 - S_1$). The other stationary deviation $S_2$ is subtracted from the corrected beam positions $r_2$, $r_{14}$, $r_{26}$, $r_{38}$ and $r_{50}$ used for determining the stationary deviation $S_2$, to obtain the unstationary deviations $S_U = a_2$, $a_{14}$, $a_{26}$, $a_{38}$ and $a_{50}$ at the scanning end point by the first deflecting surface 4b, respectively (e.g., $a_2 = r_2 - S_2$).

Similarly, the unstationary deviations corresponding to the respective corrected beam position signals $S_C$ at the scanning start and end points by the second to sixth deflecting surfaces 4b are calculated.

In this manner, the unstationary deviations $S_U = a_1$ to $a_{60}$ corresponding to all of the corrected beam positions $r_1$ to $r_{60}$ are calculated.

The predicted unstationary deviation calculator 23 calculates the predicted unstationary deviations $S_P$ at the scanning start and end points in the next scanning by the same deflecting surface. Two or more unstationary deviations are selected among the plurality of unstationary deviations $S_U$ calculated by the unstationary deviation calculator 22 to obtain unstationary deviation samples. The predicted unstationary deviation $S_P$ is calculated from a prediction calculation formula using the unstationary deviation samples.

Preferably, the unstationary deviation samples are obtained from respective values of the unstationary deviation signal $S_U$ which are calculated from the beam position signals $S_A$ and $S_B$ periodically sampled with an equal time interval $\Delta t$. That is, if the time points at which the respective beam position signals form which one value of the unstationary deviation signal $S_U$ is obtained are expressed at $t_1, t_2, \ldots, t_n$, it is preferred that the following equation holds:

$$(t_2 - t_1) = (t_3 - t_2) = \ldots = (t_n - t_{n-1}) = \Delta t$$

Preferably, the time interval $(t_p - t_n)$ between:
the predetermined time $t_p$ at which the predicted unstationary deviation $S_P$ is generated; and
the detection time $t_n$ of the beam position signal corresponding to the latest unstationary deviation $S_U$ among the unstationary deviation samples; is also equal to the time interval $\Delta t$.

The prediction calculation may be attained through a linear or functional extrapolation. An example of the formulas for calculating a predicted unstationary deviation $S_P = a_n$ from three past unstationary deviation samples $S_U = \beta_1$, $\beta_2$ and $\beta_3$ is:

$$a_n = \beta_1 - 3\beta_2 + 3\beta_3 \quad (4)$$

Formula (4) determines the predicted unstationary deviation $a_n$ by the extrapolation of the unstationary deviation samples $\beta_1$, $\beta_2$ and $\beta_3$ with a discrete quadratic function. An example will be given for calculating a predicted unstationary deviation $S_P = a_{61}$ at the scanning start point of the next scanning line by the first deflecting surface 4b after the detection of the sixty past beam position signals $d_1$ to $d_{60}$. If three past unstationary deviations $a_{25}$, $a_{37}$ and $a_{49}$ at the scanning start point by the first deflecting surface 4b are selected as samples and Formula (4) is applied thereto, the predicted unstationary deviations $S_P = a_{61}$ is given by:

$$a_{61} = a_{25} - 3a_{37} + 3a_{49} \quad (5)$$

An example will be given for calculating a predicted unstationary deviation $a_{62}$ at the scanning end point of the next scanning line by the first deflecting surface 4b. If three past unstationary deviations $a_{26}$, $a_{38}$ and $a_{50}$ at the scanning end point by the first deflecting surface 4b are selected as samples and Formula (4) is applied thereto, the predicted unstationary deviation $S_P = a_{62}$ is given by:

$$a_{62} = a_{26} - 3a_{38} + 3a_{50} \quad (6)$$

As above described, the predicted unstationary deviation $a_p$ ($= a_{61}$, for example) and the past unstationary deviations $\beta_i$ ($= (\beta_1, \beta_2, \beta_3) = (a_{25}, a_{37}, a_{39})$, for example) used for calculating the predicted unstationary deviation $a_p$ are obtained at an equal time interval $\Delta t$ in Formula (4). However, the past unstationary deviations $\beta_i$ used in Formula (5) for calculating the predicted unstationary deviation $a_p$ at the scanning start point of the next scanning line by the first deflecting surface 4b may be different from the unstationary deviations at the scanning start point by the first deflecting surface 4b. Since the unstationary deviations at the scanning start point by the respective deflecting surfaces correspond to the beam position signals detected at equal time interval $\Delta t$, the past unstationary deviations at the scanning start point by an arbitrary one of the deflecting surfaces are adoptable as the past unstationary deviations in Formula (5).

Figure 8A:
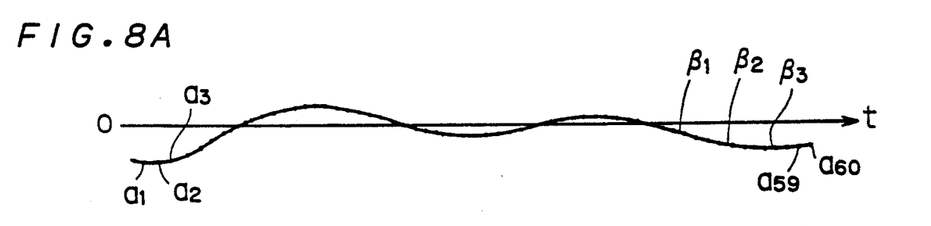
FIGS. 8A and 8B illustrate the calculation of a predicted unstationary deviation.
Figure 8B:
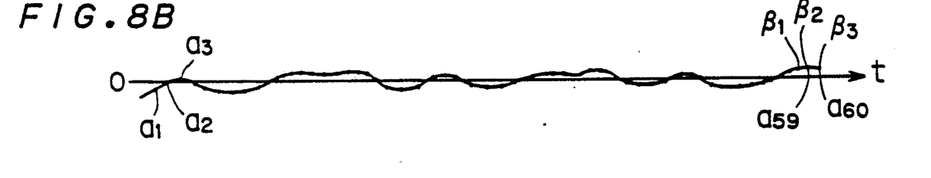

The selection of the past unstationary deviations depends on the frequency characteristic of the unstationary deviations. When the unstationary deviations changes in a relatively low frequency as shown in FIG. 8A, unstationary deviations $\beta_1$, $\beta_2$ and $\beta_3$ in FIG. 8A which appear at a relatively long time interval are selected. On the other hand, when the unstationary deviations changes in a relatively high frequency as shown in FIG. 8B, unstationary deviations $\beta_1$, $\beta_2$ and $\beta_3$ in FIG. 8B which appear at a relatively short time interval are selected.

The frequency characteristic of the unstationary deviations may be obtained through a previous experimental measurements. Preferably, the unstationary deviations $\beta_1$, $\beta_2$ and $\beta_3$ used in Formula (4) are selected among the unstationary deviations in the immediately preceding half cycle of the change of the unstationary deviations, as shown in FIGS. 8A and 8B.

In the foregoing description, the unstationary deviations $a_{25}$, $a_{37}$ and $a_{49}$, for example, at the scanning start or end points for a same reflecting surface 4b are employed as the unstationary deviations $\beta_1$, $\beta_2$ and $\beta_3$ in Formula (4). Alternatively, in order to remove noises which may appear in the detection of the light beam, the weighted average of the respective unstationary deviation, e.g. $a_{25}$, $a_{37}$ and $a_{49}$, and their adjacent unstationary deviations may be calculated to use the weighted average values as the unstationary deviation quantities $\beta_1$, $\beta_2$ and $\beta_3$ for Formula (4). Examples of the formulas for calculating the unstationary deviations $\beta_1$, $\beta_2$ and $\beta_3$ as the weighted average values are as follows:

$$\beta_1 = (a_{24} + 2a_{25} + a_{26})/4 \quad (7)$$

$$\beta_2 = (a_{36} + 2a_{37} + a_{38})/4 \quad (8)$$

$$\beta_3 = (a_{48} + 2a_{49} + a_{50})/4 \quad (9)$$

Figure 9A:
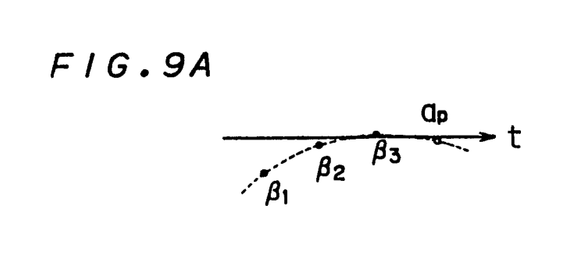
FIGS. 9A, 9B and 9C illustrate an example of the selection of past unstationary deviation used for the calculation of the predicted unstationary deviation.

In Formula (4), the predicted unstationary deviation in the next scanning is calculated by the extrapolation of the three past unstationary deviation quantities $\beta_1$, $\beta_2$ and $\beta_3$ with a quadratic or parabolic curve as shown in FIG. 9A. Alternatively, the predicted unstationary deviation calculator 23 may determine the predicted unstationary deviation by the extrapolation of the past unstationary deviations with a linear curve (straight line), a cubic curve or another polynomial curve.

Figure 9B:
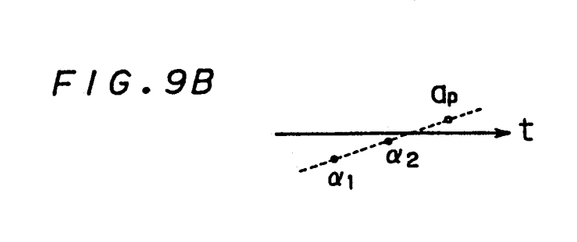
Figure 9C:
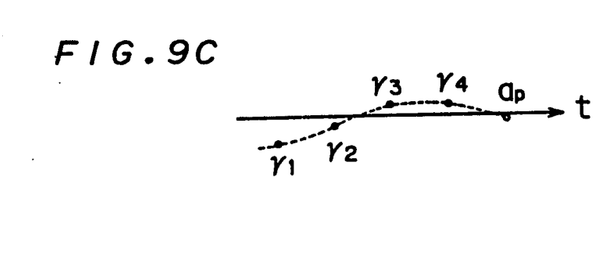

The following Formula (10) calculates the predicted unstationary deviation $a_p$ by extrapolation of the past unstationary deviations $\alpha_1$ and $\alpha_2$ with a straight line, as shown in FIG. 9B. Formula (11) calculates the predicted unstationary deviation $a_p$ by the extrapolation of the past unstationary deviations $\gamma_1$, $\gamma_2$, $\gamma_3$ and $\gamma_4$ with a cubic curve, as shown in FIG. 9C.

$$a_p = -\alpha_1 + 2\alpha_2 \qquad (10)$$

$$a_p = \gamma_1 + 2\gamma_2 - 6\gamma_3 + 4\gamma_4 \qquad (11)$$

Similarly to Formula (4), Formulas (10) and (11) are employed under the condition that the past unstationary deviations ($\alpha_1$, $\alpha_2$), ($\gamma_1$, $\gamma_2$, $\gamma_3$, $\gamma_4$) used for calculating the predicted unstationary deviation $a_p$ as well as the predicted unstationary deviation $a_p$ are arranged at equal time intervals.

The predicted unstationary deviation calculator 23, as above mentioned, executes the calculation of the formula selected among Formulas (4), (10) and (11) to determine the predicted unstationary deviation in the next scanning. Since all of the past unstationary deviations correspond to the beam position signals detected at the scanning start or end points, the predicted unstationary deviation $a_p$ calculated from Formulas (4), (10) or (11) is that for the scanning start and end point in the next scanning.

The predicted total deviation calculator 24 calculates the predicted total deviations at the scanning start and end points in the next scanning. The total deviation at an arbitrary point on a scanning line is the sum of the unstationary deviation and stationary deviation. That is, the predicted total deviation calculator 24 calculates the sum of the predicted unstationary deviation signal $S_P$ obtained in the predicted unstationary deviation calculator 23 and the stationary deviation signal $S_N$ obtained in the stationary deviation calculator 21, to determine the predicted total deviation in the next scanning.

For example, as indicated in the following Formulas (12) and (13), predicted total deviations $P_{61}$ and $P_{62}$ at the scanning start and end points in the first scanning immediately after the scanning in which the corrected beam position signals $S_C = r_1$ to $r_{60}$ are obtained are calculated from:

the predicted unstationary deviations $a_{61}$ and $a_{62}$ calculated in the predicted unstationary deviation calculator 23 (in Formulas (5) and (6)); and the stationary deviations $S_N = S_1$ and $S_2$ calculated in the stationary deviation calculator 21 (in Formulas (1) and (2)).

$$P_{61} = a_{61} + S_1 \qquad (12)$$

$$P_{62} = a_{62} + S_2 \qquad (13)$$

The driving signal calculator 25 calculates the driving signal $S_D$ for the tilt of the mirror $3b$ of the sub-deflector 3 in the next scanning to transmit the driving signal $S_D$ to the D/A converter 12. The driving signal calculated in the driving signal calculator 25 includes signal values for the scanning start and end points in the next scanning and those for a plurality of points between the scanning start and end points.

The driving signal $S_D$ at the scanning start and end points calculated by the driving signal calculator 25 makes the mirror $3b$ of the sub-deflector 3 tilt such that the predicted total deviations at the scanning start and end points calculated in the predicted total deviation calculator 24 become zero. The driving controllor 13 receives the driving signal $S_D$. When the predicted total deviation of the scanning line at the scanning start point calculated by the predicted total deviation calculator 24 has a value of ($+y$), the driving controllor 13 drives the piezoelectric element $3c$ of the sub-deflector 3 to deflect the light beam on the recording medium 6 by a value of ($-y$) in the subscanning direction. This is a negative feedback control for cancelling the deviation of the light beam.

The driving signal calculator 25 calculates the driving signal at the plurality of points on the scanning line between the scanning start and end points. This calculation may be an interpolation using the values of the driving signal at the scanning start and end points. When the main deflector 4 is the polygon mirror as in this first preferred embodiment, the deviation of the scanning line in the subscanning direction due to the deviation of the deflecting surfaces $4b$ of the polygon mirror is represented by a trigonometric function with respect to the surface deviation. For this reason, it is preferable that the interpolation of the driving signal $S_D$ at the scanning start and end points is a functional interpolation. However, the driving signal $S_D$ for points between the scanning start and end points may be calculated through a linear interpolation when a different type of main deflector is used and/or when errors are expected to be within an allowance.

The processor 11, as above described, produces the driving signal for driving the sub-deflector 3 through the calculators 20–25.

Description will be now given on the control process conducted in the light beam scanning apparatus AP having the above-mentioned compositions.

Before enabling the light beam scanning apparatus AP, the memories 10A and 10B are in reset states and have no data stored therein for detecting the scanning deviations of the light beam.

When the light beam scanning apparatus AP is enabled, the main deflector 4 starts to rotate. When the rotation speed of the main deflector 4 reaches a predetermined speed, the reset of the memories 10A and 10B is released. Then the beam position signals at the scanning start and end points for each scanning are generated in response to the detection signals of the beam position sensors 7A and 7B. The beam position signals are sequentially stored in the memories 10A and 10B. The processor 11 does not start calculations until the number of beam position signals stored in the memories 10A and 10B reaches a predetermined number M. The number M is arbitrary and is previously stored in the memories 10A and 10B. The number M is proportional to rotations of the main deflector 4 during which the beam position signals can be stored in the memories 10A and 10B without being deleted from the memories 10A and 10B. Preferably, several thousands of the beam position signals are stored in the memories 10A and 10B for each scanning start and end point to ensure accuracy of the stationary deviations $S_N$ calculated in the stationary deviation calculator 21. The processor 11 generates a constant level to the driving signal $S_D$ to output the same to the D/A converter 12 during an approach-run time period until M-values of the beam position signal are stored in the memories 10A and 10B. The driving controllor 13, hence, does not apply the drive voltage to the piezoelectric element 3c of the sub-deflector 3 to actuate it during the approach-run time period. The angle of the mirror 3b of the sub-deflector 3 is fixed to a reference angle. The beam position sensors 7A and 7B output the detection signals in accordance with the positional displacement at the scanning start and end points of the light beam corresponding to the angle of the mirror 3b fixed. The reference angle is previously determined such that the light beam reflected by mirror 3b of the sub-deflector 3 being at the reference angle passes through the target positions at the scanning start and end points when the deflecting surfaces 4b of the main deflector 4 has neither a stationary deviation nor unstationary deviation.

When the M-values of the beam position signals are stored in the memories 10A and 10B, the processor 11 executes the calculations described below to produce the driving signal $S_D$ required for the light beam deflected by the main deflector 4 to pass through the target position on the recording medium 6.

The signal correction circuit 20 converts the beam position signals $S_A$ and $S_B$ into the corrected beam position signal $S_C$. The beam position signals $S_A$ and $S_B$ stored in the memories 10A and 10B during the approach-run time period correspond to the beam position signals detected while the mirror 3b of the sub-deflector 3 has no tilt. Thus the corrected beam position signal $S_C$ obtained in the first calculation of the signal correction circuit 20 immediately after the storage of the M-values of the beam position signals $S_A$ and $S_B$ has the same value as the original beam position signals $S_A$ and $S_B$.

Next, the stationary deviation calculator 21 calculates the stationary deviations $S_N$ at the scanning start and end points for each deflecting surface 4b of the main deflector 4. The stationary deviations $S_N$ thus calculated may be stored in a memory in the form of the stationary deviations inherent in the main deflector 4, i.e., the deviations of the scanning line due to shaping or cutting errors in the formation of the deflecting surfaces 4b.

The unstationary deviation calculator 22 calculates the unstationary deviations $S_U$ corresponding to the M-values of the beam position signals $S_A$ and $S_B$ in the memories 10A and 10B, that is, the deviations due to the fluctuation of the axis of the main deflector 4. The unstationary deviations $S_U$ thus obtained provide values of the unstationary deviations at the scanning start and end points for the past time period, and are stored in the memories 10A and 10B.

The light beam scanning apparatus AP of FIGS. 1 and 2 detects the stationary and unstationary deviations in the past scannings in the foregoing processes.

The light beam scanning apparatus AP then calculates the predicted values of the unstationary deviations $S_P$ at the scanning start and end points in the next scanning through the predicted unstationary deviation calculator 23.

The predicted total deviation calculator 24 calculates the predicted total deviations $S_T$ at the scanning start and end points in the next scanning. The predicted total deviation $S_T$ is the sum of the predicted unstationary deviation $S_P$ calculated in the predicted unstationary deviation calculator 23 and the stationary deviation $S_U$ calculated in the stationary deviation calculator 21.

The driving signal calculator 25 calculates the driving signal $S_D$ required for the light beam to pass through the target position at the scanning start and end points in the next scanning. The driving signal calculator 25 also interpolates the previously calculated driving signal $S_D$ at the scanning start and end positions to calculate the driving signal $S_D$ at the plurality of positions between the scanning start and end points.

The driving signal calculator 25 outputs the driving signal $S_D$ in synchronism with the main scanning of the light beam. The driving controllor 13 applies the driving voltage to the piezoelectric element 3c of the sub-deflector 3. The piezoelectric element 3c is thus actuated as a function of the driving signal $S_D$ at the plurality of positions between the scanning start and end points while the light beam carries out the scanning. This provides for the rotary displacement of the angle or tilt of the mirror 3b of the sub-deflector 3 such that the scanning line of the light beam passes through the target position at each position.

In the light beam scanning apparatus AP, while the light beam carries out the scanning with deflection at the mirror 3b of the sub-deflector 3 tilted, the beam position sensors 7A and 7B sequentially detect the positional displacement of the light spot LP of the light beam at the scanning start and end points to store the detected positional displacement as the beam position signals $S_A$ and $S_B$ in the memories 10A and 10B. In the memories 10A and 10B, as above mentioned, the oldest beam position signal is sequentially deleted each time the new beam position signal are stored. The foregoing processings are repeated in the succeeding scannings for the beam position signals currently stored in the memories 10A and 10B, whereby the angle of the mirror 3b of the sub-deflector 3 is adjusted such that the scanning line of the light beam passes through the target position. When the beam position signals detected while the mirror 3b is tilted are used, the signal correction circuit 20 adds to the beam position signals $S_A$ and $S_B$ the predicted total deviations $S_T$ corresponding to the beam position signals $S_A$ and $S_B$, so that the corrected beam position signal $S_C$ outputted from the signal correction circuit 20 are not equal to the beam position signals $S_A$ and $S_B$.

The angle of the mirror 3b is thus adjusted gradually for the scanning of the light beam toward the target positions.

In the first preferred embodiment, the stationary deviations $S_N$ at the scanning start and end points for the respective deflecting surfaces 4b are sequentially calculated as a function of the newly detected beam position signals $S_A$ and $S_B$. Alternatively, the stationary deviations $S_N$ calculated as a function of the beam position signals $S_A$ and $S_B$ detected during the approach-run time period may be stored to calculate the unstationary deviations $S_U$, predicted unstationary deviations $S_P$, predicted total deviations $S_T$ and driving signal $S_D$ in all scannings as a function of the stored stationary deviations $S_N$.

Figure 10:
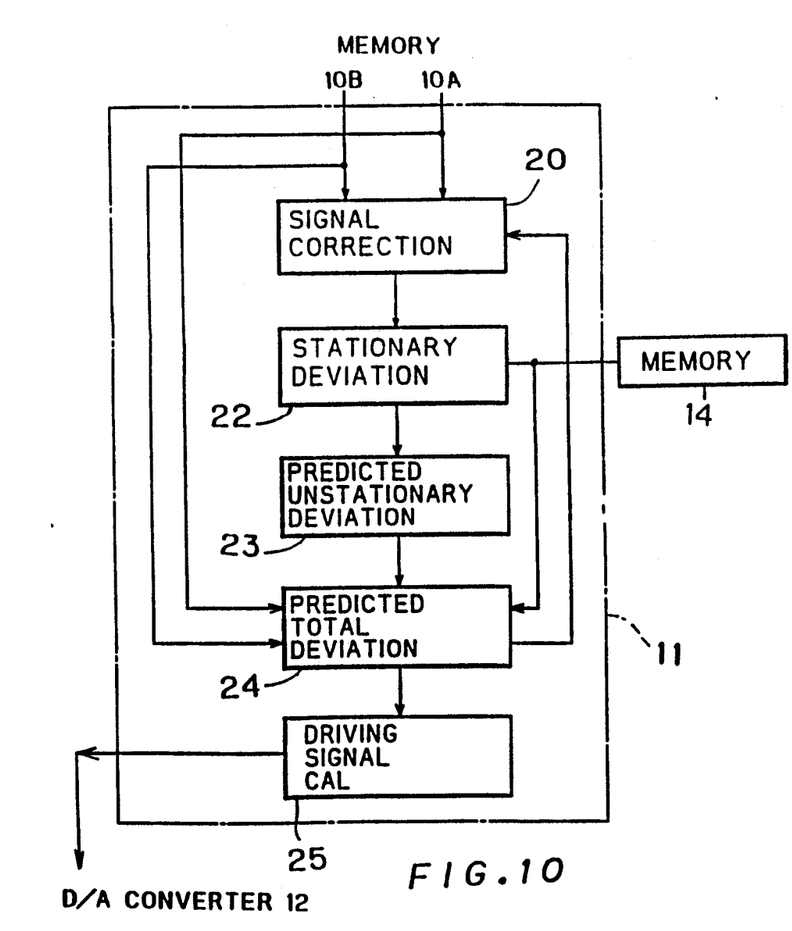
FIG. 10 is a structural diagram of a processor for a light beam scanning apparatus according to another preferred embodiment of the present invention.

FIG. 10 shows a major part of the light beam scanning apparatus according to a second preferred embodiment of the present invention. The light beam scanning apparatus of the second preferred embodiment does not include the stationary deviation calculator for calculating the stationary deviations. Instead, a memory 14 storing previously-calculated stationary deviations is connected to a processor 11'. the stationary deviations stored in the memory 14 may be provided by the similar process to the stationary deviation calculator 21, or may be obtained through another process. The remaining constructions of the processor 11' are the same as those of the processor 11 of the first preferred embodiment. That is, the processor 11' includes the signal correction circuit 20, the unstationary deviation calculator 22, the predicted unstationary deviation calculator 23, the predicted total deviation calculator 24 and the driving signal calculator 25.

The remaining constructions (not shown in FIG. 10) of the light beam scanning apparatus of the second preferred embodiment are similar to those of the light beam scanning apparatus AP of the first preferred embodiment. The light beam scanning apparatus of FIG. 10 calculates the unstationary deviations, predicted unstationary deviations, predicted total deviations and driving signal in the same operation as the apparatus AP of the first preferred embodiment except that the apparatus of FIG. 10 itself does not calculate the stationary deviations $S_N$. The piezoelectric element 3c of the sub-deflector 3 is then actuated as a function of the driving signal, and the angle of the mirror 3b is adjusted such that the light beam scans the target position.

The apparatuses of the first and second preferred embodiment detect the beam position signals both at the scanning start and end points of the scanning lines corresponding to the deflecting surfaces 4b of the main deflector 4. When the stationary deviations are regarded as common to the respective deflecting surfaces 4b, the beam position signals may be detected at only one of the scanning start and end points. That is, only one of the beam position sensors 7A and 7B may be provided. In this case, it is unnecessary that the driving signal calculator 25 calculates the driving signal $S_D$ for the plurality of points between the scanning start and end points.

The present invention is also applicable to a light beam scanning apparatus having a pivotal or vibrational light deflector such as a galvano mirror as the main deflector. An AOD may be used as the sub-deflector.

While the invention has been shown and described in detail, the foregoing description is in all aspects illustrative and not restrictive. It is therefore understood that numerous modifications and variations can be devised without departing from the scope of the invention.

I claim:

1. A method of detecting line-deviation of a scanning line of a light beam from a predetermined target line, wherein said deviation is caused in a subscanning direction crossing a main scanning direction along which said scanning line is defined, said method comprising the steps of:
   (a) providing a photosensor at a target position defined at a terminal position of said target line;
   (b) detecting said light beam by said photosensor to generate a beam position signal indicative of a positional deviation of a scanning position of said light beam from said target position in said subscanning position;
   (c) repeating the step (b) for a plurality of scanning cycles to thereby obtain a plurality of said beam position signals;
   (d) converting said beam position signals into a deviation signal including at least one component of said positional deviation; and
   (e) obtaining a line-deviation signal as a function of said deviation signal.

2. The method of claim 1, wherein the step (d) comprises the step of:
   (d-1) averaging said beam position signals to obtain a stationary deviation signal representative of stationary component of said positional deviation, said stationary component being substantially constant for the respective scanning cycles; and
   the step (e) comprises the step of:
   (e-1) obtaining said line-deviation signal as a function of said stationary deviation signal.

3. The method of claim 2, wherein the step (d) further comprises the step of:
   (d-2) subtracting said stationary deviation signal from said respective beam position signals to obtain a plurality of unstationary deviation signals representative of unstationary component of said positional deviation, said unstationary component substantially varying for the respective scanning cycles; and
   the step (e-1) comprises the step of:
   (e-1-1) obtaining said line-deviation signal as a function of said stationary deviation signal and said unstationary deviation signals.

4. The method of claim 3, wherein the step (e-1) further comprises the step of:
   (e-1-2) extrapolating said unstationary deviation signals to obtain a predicted unstationary deviation signal for a next scanning cycle.

5. The method of claim 4, wherein the step (e-1-2) comprises the step of:
   (e-1-2-1) obtaining said unstationary deviation signals at an equal time interval.

6. The method of claim 5, wherein the step (e-1-2-1) comprises the step of:
   obtaining a last one of said unstationary deviation signals at a first time point; and
   the step (e-1-2) comprises the step of:
   extrapolating said unstationary deviation signals to a second time point which is later than said first time point by said equal time interval.

7. The method of claim 6, wherein the step (e-1) further comprises the step of:
   (e-1-3) adding said stationary deviation signal to said predicted unstationary deviation signal to obtain a predicted total deviation signal representing predicted total deviation of said scanning line from said target position for the next scanning cycle.

8. The method of claim 7, wherein the step (e-1) further comprises the steps of:
   (e-1-4) repeating the step (e-1-3) for a plurality of scanning cycles to obtain a plurality of said predicted total deviation signals; and
   (e-1-5) storing said predicted total deviation signals; and the step (d) further comprises the step of:
   (d-3) adding said predicted total deviation signals to said beam position signals, respectively, to obtain a plurality of corrected beam position signals; and
   said step (d-1) comprises the step of:
   averaging said corrected beam position signals to obtain said stationary deviation signal.

9. A method of detecting line-deviation of a scanning line of a light beam from a predetermined target line, wherein said deviation is caused in a subscanning direction crossing a main scanning direction along which said scanning line is defined, said method comprising the steps of:

(a) obtaining a stationary deviation signal which is substantially constant for respective scanning cycles;

(b) storing said stationary deviation signal in memory means;

(c) providing a photosensor on a target position defined at a terminal position of said target line;

(d) detecting said light beam by said photosensor to generate a beam position signal indicative of a positional deviation of a scanning position of said light beam from said target position in said subscanning position;

(e) repeating the step (d) for a plurality of scanning cycles to thereby obtain a plurality of said beam position signals;

(f) subtracting said stationary deviation signal from said respective beam position signals to obtain a plurality of unstationary deviation signals each of which substantially varies for the respective scanning cycles; and (g) obtaining a line-deviation signal as a function of said stationary deviation signal and said unstationary deviation signals.

10. The method of claim 9, wherein the step (g) comprises the step of:

extrapolating said unstationary signals to obtain a predicted unstationary deviation signal for a next scanning cycle.

11. An apparatus for periodically deflecting a light beam to scan an objective plane along a target line defined across said objective plane, wherein a main scanning direction is defined along said target line and a subscanning direction is so defined as to cross said main scanning direction, said apparatus comprising:

first deflecting means for deflecting said light beam in said subscanning direction;

second deflecting means for periodically deflecting said light beam in said main scanning direction;

position detecting means for detecting said light beam to generate a beam position signal for each scanning cycle, said beam position signal representing deviation of said light beam from said target line in said subscanning direction; and control means for converting a plurality of said beam position signals into a deflecting signal for a next scanning cycle and for providing said deflecting signal to said first deflecting means so that said light beam traces said target line in the next scanning cycle.

12. The apparatus of claim 11, wherein said control means comprises:

position memory means for storing said beam position signals; and processing means for generating said deflecting signal as a function of said beam position signals.

13. The apparatus of claim 12, wherein said processing means comprises:

stationary deviation generating means for reading said beam position signals out of said position memory means and for calculating an average of said beam position signals to obtain a stationary deviation signal;

unstationary deviation generating means for calculating respective differences between said stationary deviation signal and said beam position signals to obtain a plurality of unstationary deviation signals;

predicted unstationary deviation generating means for generating a predicted unstationary deviation signal as a function of said unstationary deviation signals, said predicted unstationary deviation signal representing unstationary deviation of said light beam from said target line in said subscanning direction in the next scanning cycle;

total deviation generating means for calculating a summation of said predicted unstationary deviation signal and said stationary deviation signal to obtain a predicted total deviation signal representing total deviation of said light beam from said target line in said subscanning direction in the next scanning cycle; and deflecting signal generating means for generating said deflecting signal as a function of said predicted total deviation signal and for providing said deflecting signal to said first deflecting means.

14. The apparatus of claim 13, wherein said processing means further comprises:

deviation memory means for storing a plurality of said predicted total deviation signals for a plurality of the respective scanning cycles;

correcting means for reading said predicted total deviation signals out of said deviation memory means and for adding said predicted total deviation signals to said beam position signals, respectively, to obtain a plurality of corrected beam position signals; and wherein said unstationary deviation generating means calculates respective differences between said stationary deviation signal and said corrected beam position signals to obtain a plurality of said unstationary deviation signals.

15. The apparatus of claim 14, wherein said position detecting means comprises:

a first photosensor provided at a first terminal position of said target line for detecting first positional deviation of said light beam from said target line to generate a first beam position signal; and a second photosensor provided at a second terminal position of said target line for detecting second positional deviation of said light beam from said target line to generate a second beam position signal;

16. The apparatus of claim 15, wherein said deflecting signal generating means comprises:

means for generating first and second deflecting signals for said first and second terminal positions as a function of respective predicted total deviation signals obtained for said first and second terminal positions, respectively;

means for interpolating said first and second deflecting signals to obtain an interpolated deflecting signal for a point between said first and second terminal positions; and means for serially providing said first deflecting signal, said interpolated deflecting signal and said second deflecting signal to said first deflecting means.

17. An apparatus for periodically deflecting a light beam to scan an objective plane along a target line defined across said objective plane, wherein a main scanning direction is defined along said target line and a subscanning direction is so defined as to cross said main scanning direction, said apparatus comprising:

deviation memory means for storing a stationary deviation signal representative of stationary deviation of said light beam from said target line in said subscanning direction;

first deflecting means for deflecting said light beam in said subscanning direction;

second deflecting means for periodically deflecting said light beam in said main scanning direction;

position detecting means for detecting said light beam to generate a beam position signal for each scanning cycle, said beam position signal representing deviation of said light beam from said target line in said subscanning direction;

position memory means for storing a plurality of said beam position signals;

means for reading said stationary deviation signal out of said deviation memory means;

means for reading said beam position signals out of said position memory means;

means for calculating respective differences between said stationary deviation signal and said beam position signals to obtain a plurality of unstationary deviation signals representing unstationary deviations of said light beam from said target line in said subscanning direction for the respective scanning cycles;

means for obtaining a predicted unstationary deviation signal representing unstationary deviation of said light beam from said target line in said subscanning direction in a next scanning cycle as a function of said unstationary deviation signals;

means for calculating a summation of said predicted unstationary deviation signal and said stationary deviation signal to obtain a predicted total deviation signal representing total deviation of said light beam from said target line in said subscanning direction in the next scanning cycle; and means for generating a deflecting signal as a function of said predicted total deviation signal and for providing said deflecting signal to said first deflecting means.

* * * * *